(No Model.)
J. J. STEUR.
CAR STEP.
No. 510,369. Patented Dec. 5, 1893.
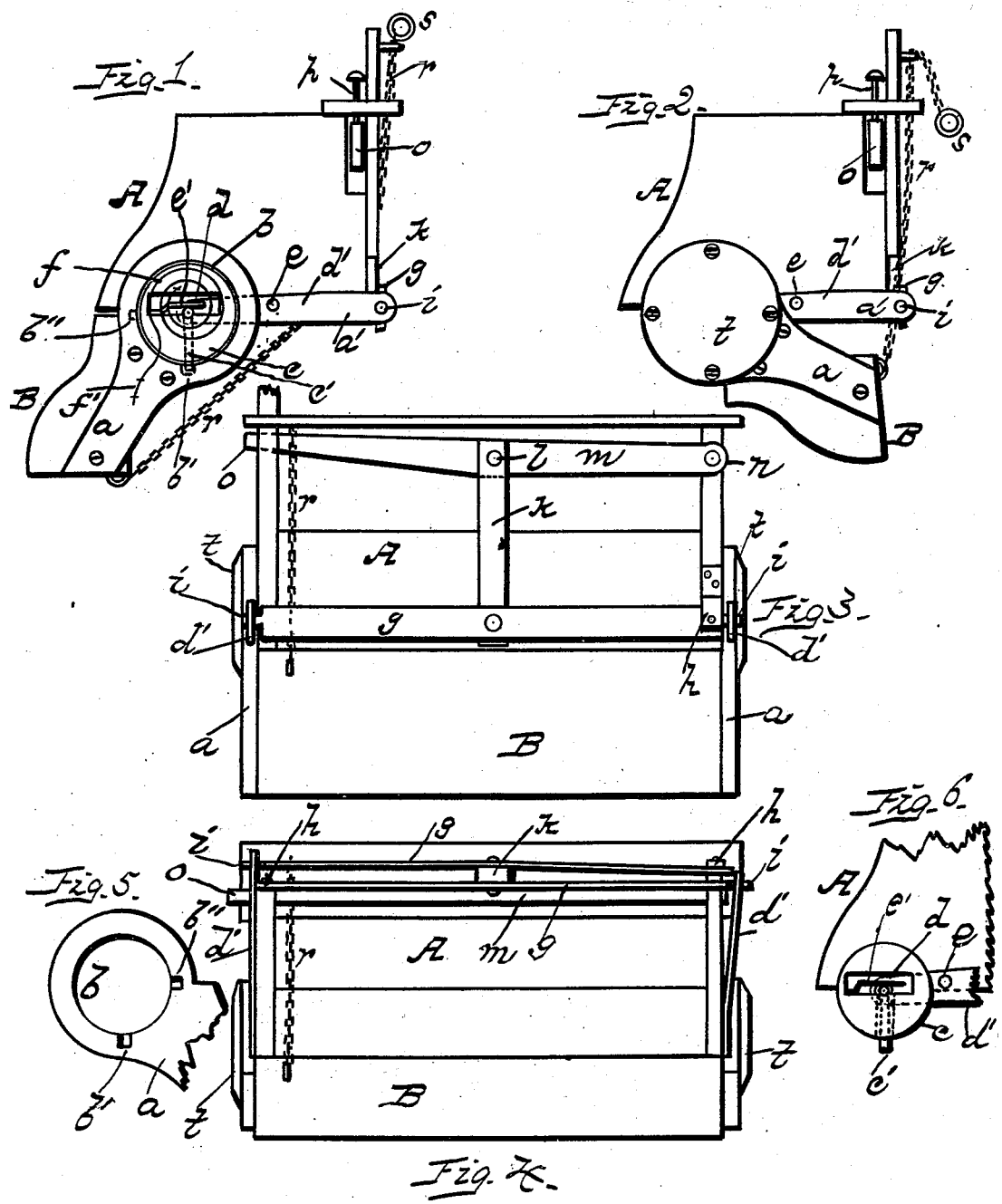
WITNESSES
INVENTOR

UNITED STATES PATENT OFFICE.

JOHN JACOB STEUR, OF ALBANY, NEW YORK, ASSIGNOR TO JACOB JAMES STIER, JR., OF JERSEY CITY, NEW JERSEY.

CAR-STEP.

SPECIFICATION forming part of Letters Patent No. 510,369, dated December 5, 1893.

Application filed July 15, 1893. Serial No. 480,604. (No model.)

*To all whom it may concern:*

Be it known that I, JOHN JACOB STEUR, a citizen of the United States, residing at Albany, in the county of Albany and State of New York, have invented certain new and useful Improvements in Car-Steps; and I do hereby declare the following to be a full, clear, and exact description of the invention, such as will enable others skilled in the art to which it appertains to make and use the same.

This invention has relation to improvements in car steps and it consists in the novel construction and arrangement of the lower or folding step, whereby the lower step can be readily folded back out of the way, when not in use, all as will be hereinafter more fully described and particularly pointed out in the appended claims.

The annexed drawings, to which reference is made, fully illustrate my invention, in which—

Figure 1, represents a side view of a car step, showing the lower step in position for use. Fig. 2, is also a side view showing the lower step folded back and out of use. Fig. 3, is a rear view of the same. Fig. 4, is a bottom view, and Figs. 5 and 6 are detail views.

Referring by letter to the accompanying drawings, A designates car steps to which my device is applied and B indicates the lower or bottom step which is movable and capable of being folded under the remaining steps of the car and out of the way when not in use. At each end of this lower step is secured brackets $a, a,$ having a circular interior opening $b,$ which is provided with two notches $b',$ $b'',$ for a purpose presently explained.

On each side of the car steps is secured a circular disk or hub $c$ which fit snugly the opening in each bracket of the lower step and upon which said bracket turns. This hub is vertically perforated in which is a pin $c',$ the upper end of which is pivoted to the end $d,$ of a side lever $d'$ which is centrally pivoted at $e$ to the sides of the steps. The lower end of this pin engages the notches in the side brackets and serves to hold the step B, in an open or folded position. A spring $e',$ bearing against the top of this pin holds the same down and in place. Within the interior opening of the bracket of each step is a spiral spring $f,$ one end of which is secured to the outer face of the hub while the opposite end $f'$ is secured to the bracket, said spring serving the purpose to force the lower step outwardly for use.

At the rear of the steps are arranged two levers $g, g,$ which are pivoted at one end to the car steps as at $h, h,$ while the opposite ends thereof are pivoted at $i, i,$ to the inner end of each of the side levers. Pivoted to the central parts of these levers $g, g,$ is a vertical bar $k,$ the upper end of which is pivoted at $l,$ to a bar $m.$ The end $n$ of the bar $m$ is pivoted to the steps while the end $o$ is free and is provided with a foot or push pin $p,$ designed to operate the lever and its connecting bars which will be hereinafter set forth.

A cord or chain $r$ is connected by one end to the rear of the lower step and extends upwardly through the platform of a car, and is provided with a hand pull or ring $s.$ A cap $t,$ is secured to the outer faces of each bracket, which may be removed at will, permitting access to the springs and pin within the bracket and hub.

Having thus described the different parts of which my device is composed I will now describe its operation.

It will be seen by reference to Fig. 1, of the drawings, that when the step is in position for use, the number of steps to the car is increased and the lower step is brought near the ground and this lower step is held in place by the pin $c',$ engaging the notch $b',$ in the bracket on each side of the step. In order to fold the step back and under the remaining steps, the operator simply bears upon the foot or push pin $p,$ thereby forcing down the bar $m,$ which in turn, through the medium of the vertical bar $k,$ forces the two bars $g, g,$ downwardly, and simultaneously, the same turning on their pivoted ends; the free pivoted ends $i, i,$ forcing the end $a',$ downwardly, of the side pivoted levers and thereby raising the pin $c',$ out of the notch in each bracket when the operator pulls the chain or cord and draws the pivoted lower step inwardly and under the main steps and the pin $c',$ falls in the second notch $b''$ and is held thereby in a folded position. When it is desired to project the pivoted lower step in position for use, the operator simply presses down the foot or push pin, and through the medium of the pivoted levers and rods or bars above set forth, the pins in each of the side brackets are withdrawn from the notch in said brackets and the spiral spring causes the step to project or swing outwardly in position. Thus, it will be observed, that the pivoted lower step is thrown in position for use simply by the operator pressing the push pin and when in position, the same is held firmly in place, and the device as herein described is durable and at the same time cheap to manufacture.

What I claim, and desire to secure by Letters Patent, is—

1. A spring actuated car step, the same being pivoted to the main steps and provided with the locking pins, the centrally pivoted levers and means substantially as described for operating these locking pins as set forth.

2. The combination with the main steps of a car and the folding lower step of the spring secured at one end to the hub secured to the sides of the main steps and to the bracket, the side levers centrally pivoted to the sides of the main steps the pivoted levers $g, g$, bar $m$, and pivoted foot bars, and chain or rope, all substantially as described and for the purpose specified.

3. The within described improvement in folding steps for cars consisting of the main steps having side hubs; the folding step having the side brackets, the openings thereof engaging the hubs, the spiral spring, one end of which being secured to the hub and the other end to the bracket; the locking pins passing through said hubs and engaging the notches in said brackets; the spring for holding the pins down in position and the side levers pivoted centrally to the sides of the main steps; the rear pivoted levers, vertical bar and foot lever and the operating chain or cord, all substantially as described and for the purpose specified.

In testimony whereof I affix my signature in presence of two witnesses.

JOHN JACOB STEUR.

Witnesses:
   THOS. E. ROACH,
   CLARK L. ROACH.